United States Patent [19]
Ochi et al.

[11] 3,986,589

[45] Oct. 19, 1976

[54] AIR CLUTCH INCLUDING A VARIABLE ELASTIC COUPLING

[75] Inventors: Michiyo Ochi, Suita; Eisuke Sugahara, Tokyo; Shigeru Uehara, Kawaguchi; Yoshihiro Sugizaki, Urawa; Yasuo Uchida, Tokyo, all of Japan

[73] Assignee: Nippon Piston Ring Co., Ltd., Tokyo, Japan

[22] Filed: Apr. 1, 1975

[21] Appl. No.: 563,990

[30] Foreign Application Priority Data
Apr. 1, 1974 Japan................ 49-35626

[52] U.S. Cl................ 192/88 B; 64/11 P; 64/26; 192/55
[51] Int. Cl.²........................ F16D 25/04
[58] Field of Search........... 192/88 B, 55, 48.3; 64/27 R, 27 NM, 11 B, 11 P, 26

[56] References Cited
UNITED STATES PATENTS

| 1,815,639 | 7/1931 | Wilkin et al. | 64/26 |
| 2,972,241 | 2/1961 | Hackforth | 64/26 |

FOREIGN PATENTS OR APPLICATIONS

| 1,232,080 | 4/1960 | France | 192/88 B |
| 1,182,909 | 12/1964 | Germany | 64/11 P |
| 1,208,953 | 1/1966 | Germany | 64/11 P |

*Primary Examiner*—Benjamin W. Wyche
*Attorney, Agent, or Firm*—Sughrue, Rothwell, Mion, Zinn and Macpeak

[57] ABSTRACT

An air clutch of the type having a friction drum secured to a first shaft and an inflatable annular tube concentrically surrounding said drum and carrying friction means for engagement with the drum upon inflation of the tube, is provided with a variable elastic coupling in the drum portion of the clutch. The coupling is comprised of an annular drum having a plurality of radially inwardly disposed plates extending in the axial direction and a hub member having a plurality of axially extending radially disposed plates thereon interdigitated with the plates on the drum. A bellows member is disposed between each pair of plates with the interior of the bellows being disposed in fluid communication with conduits running through the plates on the hub member. The conduits are connected to a common source of air pressure whereby the torsional rigidity of the coupling can be varied by varying the air pressure within the plurality of bellows.

4 Claims, 11 Drawing Figures

AIR CLUTCH INCLUDING A VARIABLE ELASTIC COUPLING

BACKGROUND OF THE INVENTION

The present invention is directed to an air clutch and more specifically to an air clutch having a variable elastic coupling therein.

In prior art torque transmitting systems involving a clutch for selectively interconnecting two rotating shafts, one of which may be driven by an internal combustion engine or other suitable prime mover, there were numerous design limitations necessitated by the problem of torsional vibrations in the system. It is generally well known in these cases to employ a variable elastic coupling in the system to vary the torsional rigidity of the system to overcome the torsional vibration problem.

SUMMARY OF THE INVENTION

The present invention provides a variable elastic coupling suitable for use with a pneumatic clutch wherein the coupling is of the pneumatic type so that the air pressure therein can be varied to vary the torsional rigidity of the torque transmitting system. By using the variable elastic coupling according to the present invention it is possible to remove many of the previously existing design limitations since the problem of torsional vibrations can be subsequently corrected by varying the air pressure within the coupling.

The present invention is also directed to the combination of an air clutch with the variable elastic coupling of the pneumatic type whereby a common air supply system can be utilized not only for the selective transmission of torque but to also simultaneously solve the vibration problem of the torque transmitting system.

The foregoing and other objects, features and advantages of the present invention will be apparent from the following more particular description of a preferred embodiment of the invention as illustrated in the accompanying drawings.

DETAILED DESCRIPTION OF THE INVENTION

Figure 1:
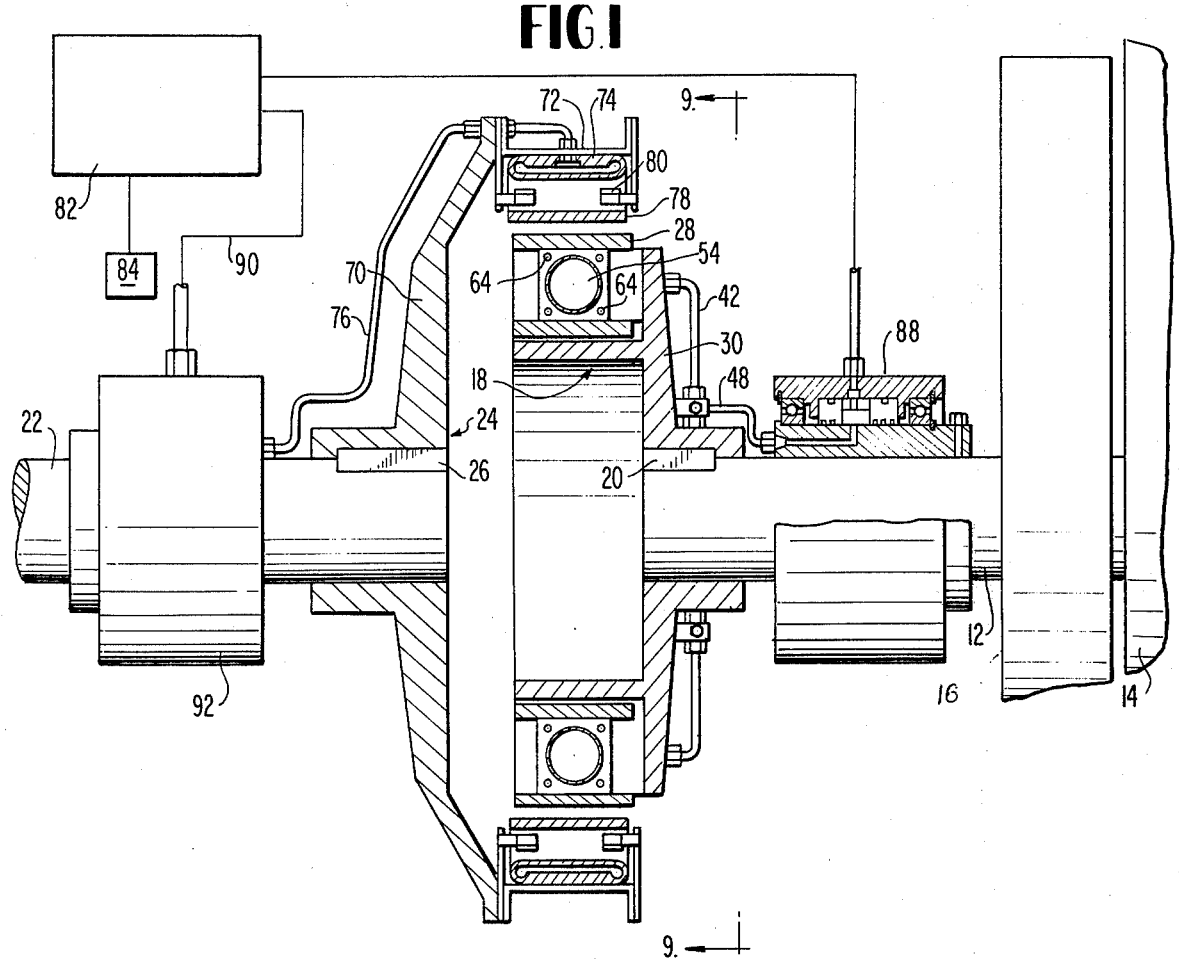
FIG. 1 is a longitudinal side elevational view, partly in section, of the torque transmitting system according to the present invention.
Figure 3:
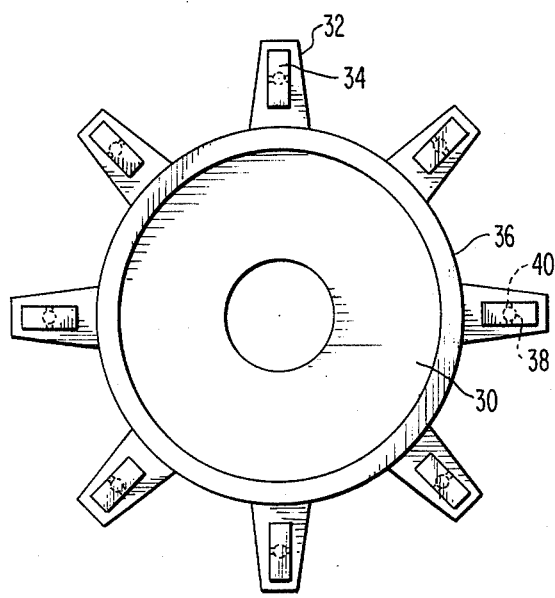
FIG. 3 is an end elevational view of the hub member as viewed from the left in FIG. 2.
Figure 2:
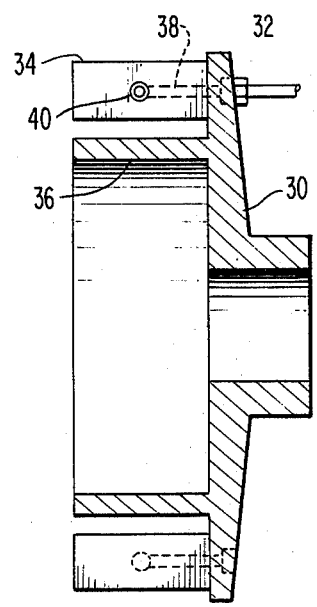
FIG. 2 is a longitudinal sectional view of the hub member for the coupling of the present invention.
Figure 4:
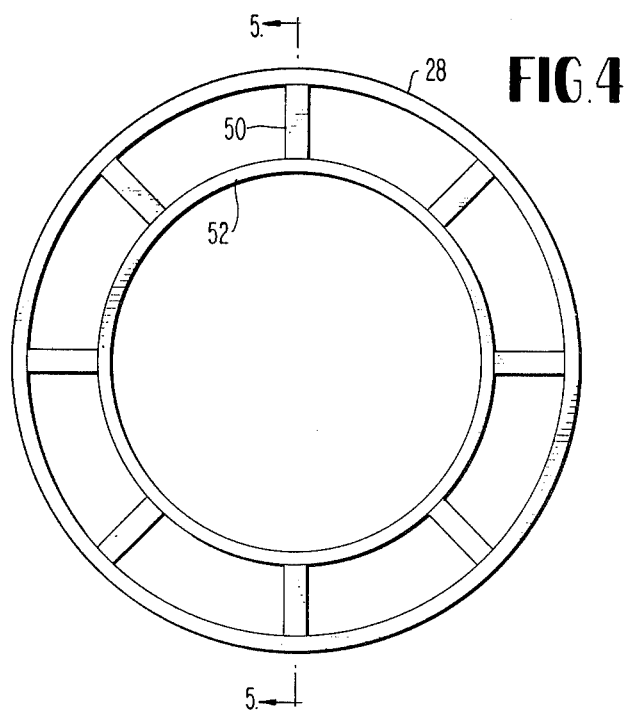
FIG. 4 is an end elevational view of the drum member which cooperates with the hub member of FIG. 3 to form the present coupling.
Figure 5:
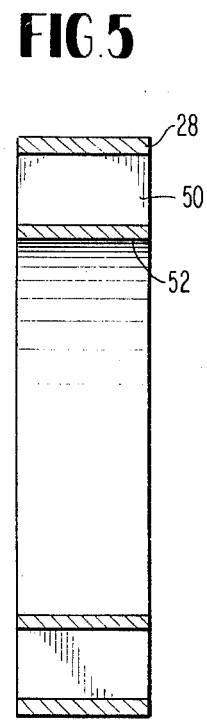
FIG. 5 is a sectional view taken along the line 5—5 of FIG. 4.

One form of the torque transmitting system according to the present invention is shown in FIG. 1 wherein the drive shaft 12 of engine 14 is provided with a flywheel 16 adjacent the engine and a first clutch member 18 which is secured to the end thereof by means of a key 20. A driven shaft 22 is coaxially aligned with the drive shaft and the second clutch member 24 is secured thereto by means of key 26.

The first clutch member 18 is comprised of a drum member 28 and a hub member 30 connected together by pneumatic means to form an adjustable elastic coupling. The hub member 30 is provided with a plurality of radially outwardly extending spokes 32 which are equally spaced apart about the circumference thereof. Each spoke 32 is provided with an axially extending radially disposed plate 34. The hub member 30 is provided with a circumferential flange 36 which is spaced radially inwardly from the plate 34 and which is axially coextensive therewith. Each plate 34 is provided with an internal air passageway 38 which intersects with a circumferentially extending through passage 40. A plurality of conduits 42 connect each passage 38 to an annular conduit 44 which in turn is connected to a supply conduit 48.

Figure 9:
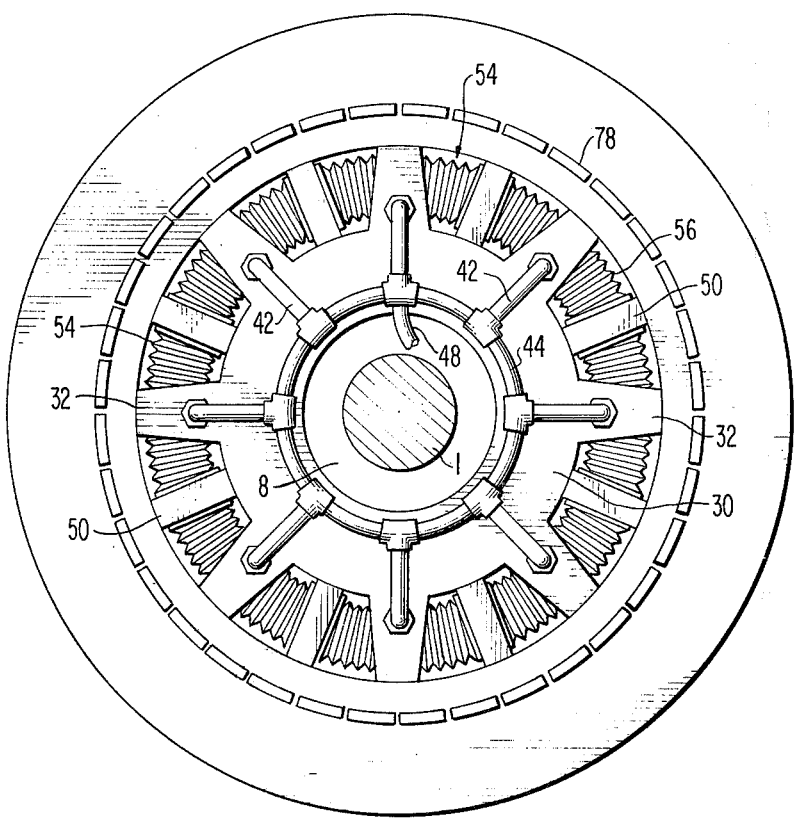
FIG. 9 is a sectional view taken along the line 9—9 of FIG. 1.
Figure 6:
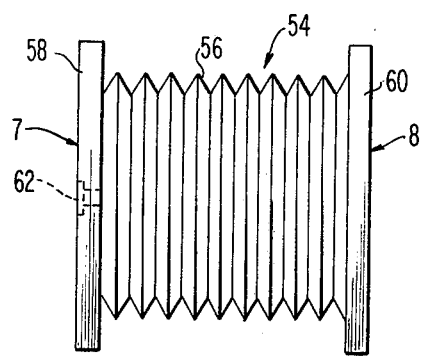
FIG. 6 is a side elevational view of a bellows according to the present invention.
Figure 7:
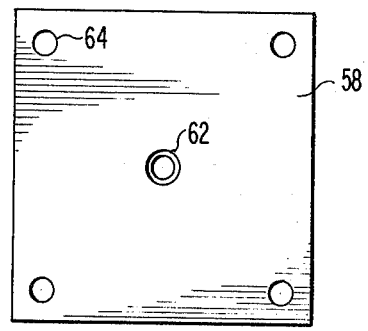
FIG. 7 is an end elevational view of the bellows according to FIG. 6 as viewed in the direction of the arrow 7.
Figure 8:
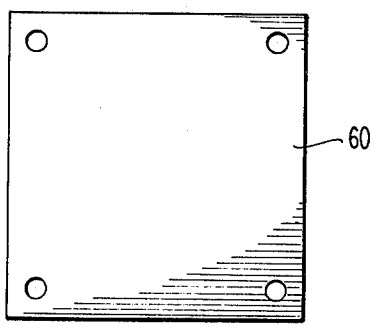
FIG. 8 is an end elevational view of the bellows shown in FIG. 6 taken in the direction of the arrow 8.
Figure 11:
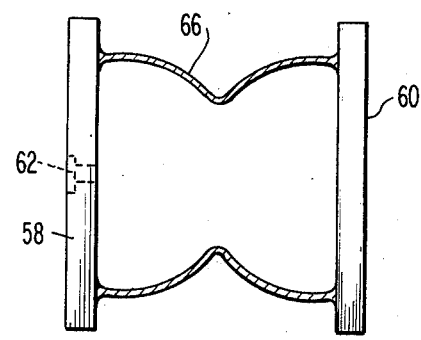
FIG. 11 is a side elevational view, partly in section, showing the modified form of bellows according to the present invention.

The second part of the first clutch member 18 is comprised of an annular drum member 28 having a plurality of radially extending axially disposed plates 50 the inner ends of which are connected by an annular member 52. In the assembled condition of the two clutch members the plates 34 and 50 are interdigitated and the annular member 52 is disposed in the space between the plates 34 and the flange 36. A bellows unit 54 is disposed between each plate 34 on the hub member 30 and the adjacent plate 50 on the hub member 28. Each bellows unit 54 is comprised of a flexible hollow tube-like member 56 as shown in FIGS. 6 and 9 having end plates 58 and 60 secured thereto. The end plate 58 is provided with a through passage 62 which communicates with the interior of the bellows member 56 whereas the end plate 60 is imperforate. Both end plates 58 and 60 are provided with apertures 64 for receiving bolts or the like for securing the plates 58 and 60 to plates 34 and 50, respectively. A modified form of bellows is shown in FIG. 11 wherein the flexible portion of the bellows 66 may be in the form of a double bulb-like bellows. It is obvious that other contours could also be utilized.

The clutch part 24 is comprised of a hub portion 7 having a circumferential flange 72 secured thereto. An inflatable tube-like pneumatic member 74 is secured to the inner surface of the flange 72 and is connected to a conduit 76 for the purpose of inflating and deflating the expandable pneumatic member 74. A plurality of friction members 78 are secured to the flange 72 by means of spring members 80 so that upon expansion or inflation of the member 74 a spring member 80 which carried the friction member 78 will press the friction members into engagement with the drum member 28 to provide for the transmission of torque from the shaft 12 to the shaft 22. The exact details of the inflatable member 74 and the manner which the friction members are secured thereto may be varied in accordance with the teachings of numerous well known prior art constructions with respect to this feature.

An air supply control panel 82 which is connected to any suitable supply of air under pressure 84 controls the supply of air through the conduit 86 to the rotary fluid distributor 88 for supplying air to the adjustable pneumatic means or below units 54 through the conduits 48, 44, 42, 38 and 40. Likewise, the control panel 82 controls the supply of air under pressure through the conduit 90 to the rotary fluid distributor 92 to supply air through the conduit 76 to the expandable pneumatic means or inflatable tube 74.

Figure 10:
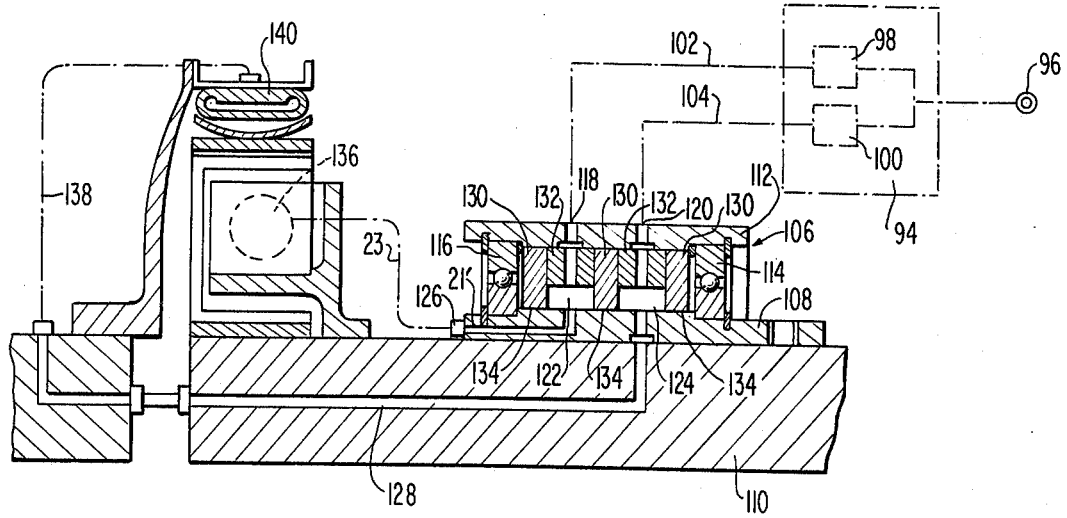
FIG. 10 is a longitudinal sectional view of a modified torque transmitting system according to the present invention.

A modified form of fluid distribution as shown in FIG. 10 wherein an air supply control panel 94 is connected to a pressurized air supply 96. Suitable pressure regulating means 98 and 100 are disposed within the air supply control panel 94 for providing the correct air pressure through conduits 102 and 104 respectively to the rotary air distribution member 106. The air distribution member 106 is comprised of a sleeve 108 secured to the shaft 110 and a stationary sleeve 112 journaled on the sleeve 108 by means of bearings 114 and 116. The conduits 102 and 104 are connected to passages 118 and 120 in the sleeve 112 to chambers 122 and 124 which in turn are connected to conduits 126 and 128, respectively. The chambers 122 and 124 are defined by annular rings 130 of ferromagnetic material and annular magnet rings 132 having bores therethrough in communication with the inlet passages 118 and 120. A magnetic closed circuit is composed by the annular rings 130 which disposed on both sides of the magnet rings 132 and pressure supply ring 21' which made of ferromagnetic material. A magnetic fluid 134 which entrained between the annular ring 130 and the pressure supply ring 21' is maintained in said entrained position by means of magnetic force of the magnet ring 132, and sealing effect is generated. The conduit 126 directs the air to the bellows units 136 in the manner disclosed in the previous embodiment and the conduit 128 directs the air through conduit 138 to the expandable pneumatic tube 140 in the manner previously disclosed.

While the invention has been particularly shown and described with reference to preferred embodiments thereof, it will be understood by those in the art that the foregoing and other changes in form and details may be made therein without departing from the spirit and scope of the invention.

What is claimed is:

1. A variable elastic coupling comprising a first annular member adapted to be coupled to a first rotary means, a second annular member adapted to be coupled to a second rotary means, said first annular member having a first plurality of radially disposed plates, said second annular member having a second plurality of radially disposed plates interdigitated with said first plates, adjustable pneumatic means operatively disposed between adjacent plates, and passage means disposed in each of said second plates having an inlet adapted to be connected to a common pressurized air source and having outlets on opposite circumferentially directed faces of each of said second plates, said outlets being disposed in communication with said adjustable pneumatic means so that upon varying the pressure of said common source the pressure in each of said adjustable pneumatic means will likewise be varied simultaneously to vary the rigidity of the coupling.

2. A coupling as set forth in claim 1 wherein each of said adjustable pneumatic means is comprised of a pair spaced apart end plates, a bellows connected between said end plates one of which has an aperture therethrough disposed in communication with the interior of said bellows and means for operatively connecting said end plates to adjacent plates on said first and second annular members with the aperture in one of said end plates being disposed in communication with an outlet on one of said second plates.

3. An air clutch comprising first and second coaxial rotary shaft means, annular flange means connected to one of said shaft means and disposed in concentric relation with respect to the other of said shaft means, expandable pneumatic means connected to the internal surface of said flange means, friction means operably connected to said expandable pneumatic means and a variable elastic coupling operably connected to said other of said shaft means concentrically inwardly of said flange means and having a circumferential drum thereon for engagement by said friction means upon expansion of said expandable pneumatic means, said variable elastic coupling comprising a first plurality of radially extending plates extending inwardly from said drum, a second plurality of axially extending plates mounted for rotation with the other of said shaft means and disposed in interdigitated relation with said first plates, adjustable pneumatic means operatively disposed between adjacent plates, and passage means disposed in each of said second plates having an inlet adapted to be connected to a common pressurized air source and having outlets on opposite circumferentially directed faces of each of said second plates, said outlets being disposed in communication with said adjustable pneumatic means so that upon varying the pressure of said common source the pressure in each of said adjustable pneumatic means will likewise be varied simultaneously to vary the rigidity of said coupling.

4. An air clutch as set forth in claim 3 wherein each of said adjustable pneumatic means is comprised of a pair of spaced apart end plates, a bellows connected between said end plates one of which has an aperture therethrough disposed in communication with the interior of said bellows and means for operatively connecting said end plates to adjacent plates on said drum and said other of said shaft means with the aperture in one of said end plates being disposed in communication with an outlet on one of said second plates.

* * * * *